: US 10,361,767 B2
(45) Date of Patent: Jul. 23, 2019

(54) RELAY DEVICE, PROGRAM FOR RELAY DEVICE, AND INFORMATION PROCESSING SYSTEM

(71) Applicant: KONICA MINOLTA, INC., Chiyoda-ku, Tokyo (JP)

(72) Inventor: Hiroyuki Kawabata, Kawanishi (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/726,157

(22) Filed: Oct. 5, 2017

(65) Prior Publication Data

US 2018/0123676 A1  May 3, 2018

(30) Foreign Application Priority Data

Oct. 28, 2016  (JP) .................................. 2016-212015

(51) Int. Cl.
| | |
|---|---|
| *H04B 7/14* | (2006.01) |
| *H04L 12/66* | (2006.01) |
| *H04L 29/12* | (2006.01) |
| *H04L 29/06* | (2006.01) |

(52) U.S. Cl.
CPC .............. *H04B 7/14* (2013.01); *H04L 12/66* (2013.01); *H04L 61/2582* (2013.01); *H04L 69/16* (2013.01)

(58) Field of Classification Search
CPC ....... H04B 7/14; H04L 61/2582; H04L 12/66; H04L 69/16
See application file for complete search history.

(56) References Cited

U.S. PATENT DOCUMENTS

| | | | |
|---|---|---|---|
| 6,965,599 B1 | 11/2005 | Sakurai et al. | |
| 7,406,079 B2 | 7/2008 | Yokomitsu et al. | |
| 8,874,757 B2 | 10/2014 | Souza | |
| 2005/0041596 A1* | 2/2005 | Yokomitsu ........ | H04L 29/12283 370/252 |
| 2009/0080420 A1 | 3/2009 | Van Der Poel et al. | |
| 2009/0275119 A1 | 11/2009 | Sugiyama et al. | |
| 2011/0202644 A1 | 8/2011 | Souza | |

FOREIGN PATENT DOCUMENTS

| | | |
|---|---|---|
| EP | 1793564 A1 | 6/2007 |
| JP | 11345106 A | 12/1999 |
| JP | 2001160825 A | 6/2001 |
| JP | 2007219711 A | 8/2007 |
| WO | 2009078772 A1 | 6/2009 |

OTHER PUBLICATIONS

Extended European Search Report (EESR) dated Mar. 16, 2018 issued in counterpart European Application No. 17197034.6.

* cited by examiner

*Primary Examiner* — Curtis A Alia

(74) *Attorney, Agent, or Firm* — Holtz, Holtz & Volek PC

(57) ABSTRACT

A relay device includes: a hardware processor that refers to association information associating an address of a device and a port number in a first network with a port number of a second network to relay communication between the device in the first network and a device in the second network, wherein the hardware processor dynamically changes the association information on the basis of a state of the device in the first network.

16 Claims, 10 Drawing Sheets

FIG. 3

FORWARDING TABLE 40

| PROTOCOL | EXTERNAL PORT NUMBER | LAN SIDE IP ADDRESS | LAN SIDE PORT NUMBER |
|---|---|---|---|
| – | 1 | – | – |
| TCP/UDP (FTP CONTROL) | 21 | 192.168.1.40 | 21 |
| | | 192.168.1.50 | 21 |
| TCP/UDP (LPR) | 9100 | 192.168.1.40 | 9100 |

FIG. 4

FORWARDING TABLE 40

| PROTOCOL | EXTERNAL PORT NUMBER | LAN SIDE IP ADDRESS | LAN SIDE PORT NUMBER |
|---|---|---|---|
| – | 1 | – | – |
| TCP/UDP (HTTP) | 80 | 192.168.1.40 | 80 |
| TCP/UDP (FTP CONTROL) | 21 | 192.168.1.40 | 21 |
| | | 192.168.1.50 | 21 |
| TCP/UDP (LPR) | 9100 | 192.168.1.40 | 9100 |

FIG. 5

FORWARDING TABLE 40

| PROTOCOL | EXTERNAL PORT NUMBER | LAN SIDE IP ADDRESS | LAN SIDE PORT NUMBER |
|---|---|---|---|
| – | 1 | – | – |
| TCP/UDP (HTTP) | 80 | 192.168.1.40 | 80 |
| TCP/UDP (FTP CONTROL) | 21 | 192.168.1.40 | 21 |
| | | 192.168.1.50 | 21 |
| TCP/UDP (LPR) | 9100 | – | – |

FORWARDING TABLE 40

| PROTOCOL | EXTERNAL PORT NUMBER | LAN SIDE IP ADDRESS | LAN SIDE PORT NUMBER |
|---|---|---|---|
| – | 1 | – | – |
| TCP/UDP (HTTP) | 80 | – | – |
| TCP/UDP (FTP CONTROL) | 21 | 192.168.1.40 | 21 |
| | | 192.168.1.50 | 21 |
| TCP/UDP (LPR) | 9100 | 192.168.1.40 | 9100 |

RELAY DEVICE, PROGRAM FOR RELAY DEVICE, AND INFORMATION PROCESSING SYSTEM

Japanese Patent Application No. 2016-212015 filed on Oct. 28, 2016, including description, claims, drawings, and abstract the entire disclosure is incorporated herein by reference in its entirety.

BACKGROUND

Technological Field

The present disclosure relates to relay devices, programs for relay devices, and information processing systems, and in particular, to a relay device, a program for the relay device, and an information processing system.

Description of the Related Art

In the related art, various proposals have been made on a relay device that relays data transmission. For example, JP 2007-219711 A discloses a program for remote device control that: acquires connection information of a peripheral device locally connected to another computer via a network; displays the connection information to a user to facilitate selection; performs switching of control right of a peripheral device driver corresponding to the peripheral device selected by the user; and performs data conversion processing between a data structure for the peripheral device and a data structure for the network.

JP 11-345106 A discloses a management server that converts a monitoring signal of Simple Network Management Protocol (SNMP) output from a network printer into an HTML signal conforming to HTTP, and outputs this HTML signal to a terminal equipped with a World Wide Web (WWW) browser as push type information.

JP 2001-160825 A discloses packet relay device that refers to an address conversion result of a transmission data relaying unit to perform inverse conversion on a destination virtual Internet Protocol (IP) address into the original address.

A router, which is an example of a relay device that relays communication between networks, refers to information such as a forwarding table and relays data. For example, a router forwards data from an external network to a device in a device of an internal network. The router identifies the device as a transfer destination in accordance with the forwarding table.

In the related art, in the case where a new device is registered in an internal network, an administrator of the internal network registers the new device in the router. Thus, there is a disadvantage that it is cumbersome for the administrator to grasp devices in the internal network and to perform setting of the registration and other processes.

SUMMARY

The present disclosure has been devised in view of the above circumstances, and an object thereof is to simplify setting operation in a relay device.

To achieve the abovementioned object, according to an aspect of the present invention, a relay device reflecting one aspect of the present invention comprises: a hardware processor that refers to association information associating an address of a device and a port number in a first network with a port number of a second network to relay communication between the device in the first network and a device in the second network, wherein the hardware processor dynamically changes the association information on the basis of a state of the device in the first network.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 3 is a diagram illustrating an example of contents of a forwarding table;

FIG. 4 is a diagram illustrating another example of the forwarding table after a change;

FIG. 5 is a diagram illustrating still another example of the forwarding table after a change;

DETAILED DESCRIPTION OF EMBODIMENTS

Hereinafter, one or more embodiments of a relay device according to the present invention will be described with reference to the drawings. However, the scope of the invention is not limited to the disclosed embodiments. In the following description, the same parts and components are denoted by the same symbol. Their names and functions are also the same. Therefore, descriptions thereof are not repeated.

[1. Network System]

Figure 1:
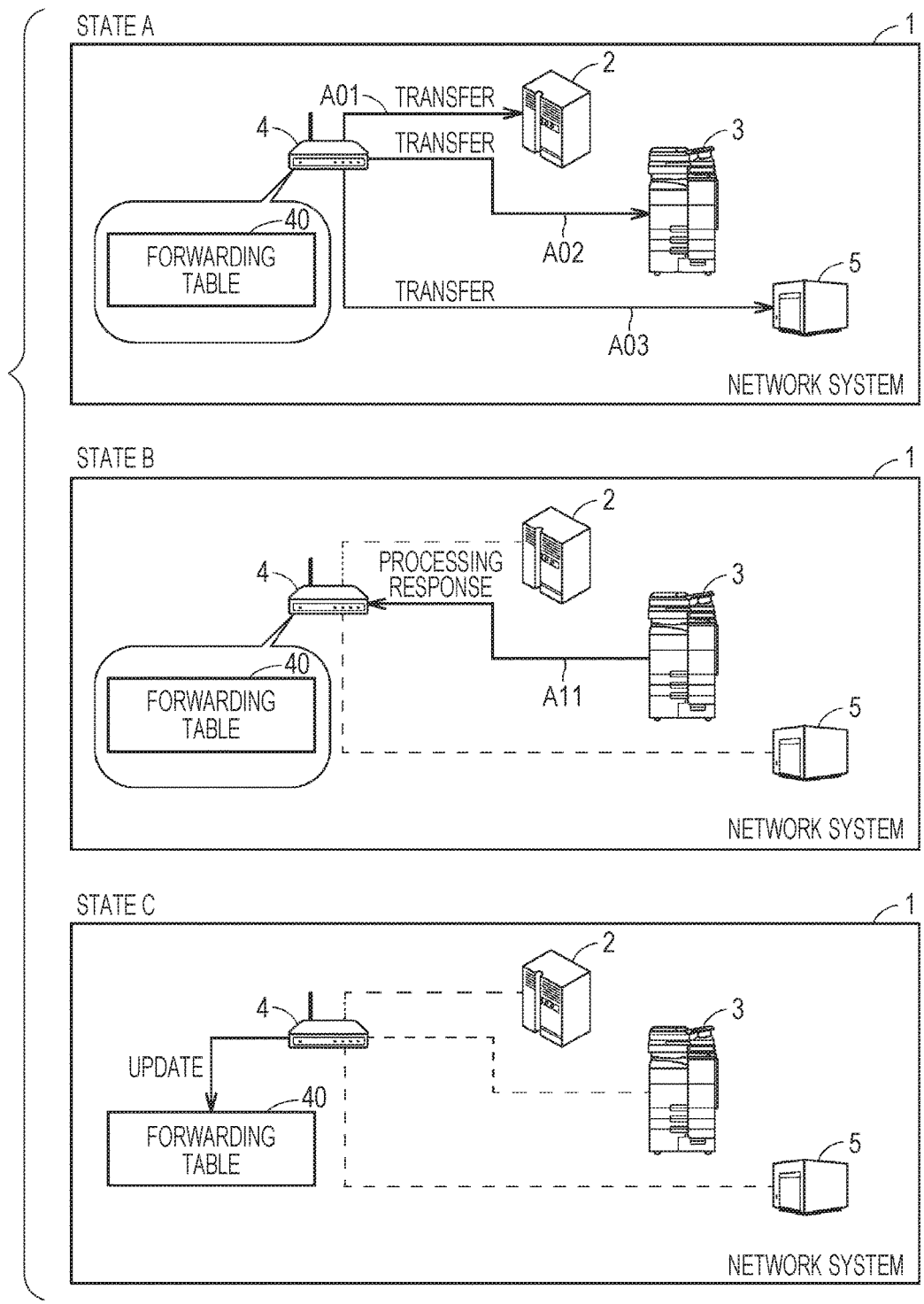
FIG. 1 is a diagram for explaining an outline of an embodiment of the present disclosure.
Figure 2:
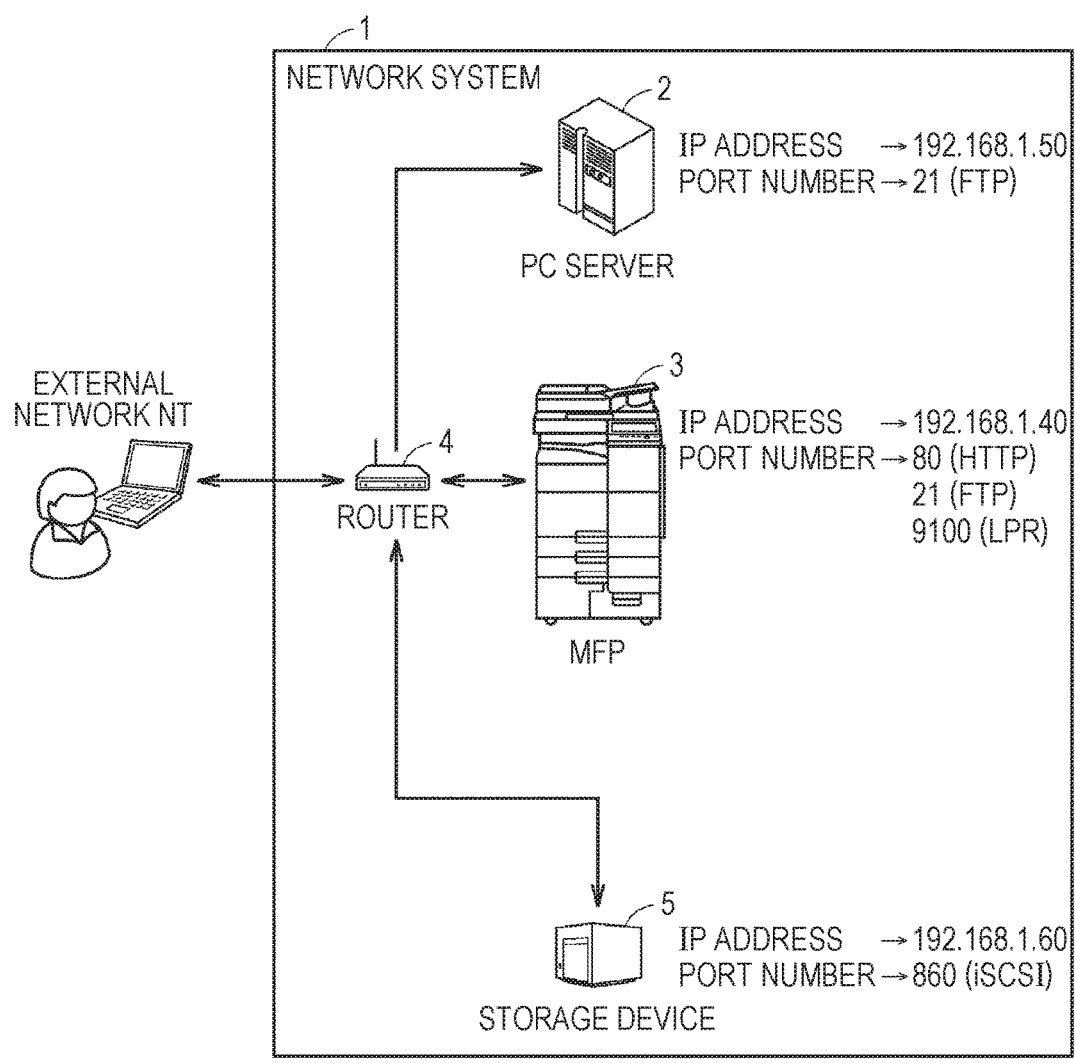
FIG. 2 is a diagram illustrating an example of a specific configuration of a network system.

FIG. 1 is a diagram for explaining an outline of the present disclosure. In FIG. 1, three states A to C of a network system 1 including a router 4 according to the present disclosure are illustrated. The network system 1 includes three devices each denoted by one of symbols 2 to 5 (a PC server 2, an MFP 3, and a storage device 5) which communicate with an external network via the router 4. FIG. 2 is a diagram illustrating an example of a specific configuration of the network system 1. In FIG. 2, an example of IP addresses and port numbers assigned to each of the PC server 2, the MFP 3, and the storage device 5 is illustrated.

The router 4 relays communication among the devices in the network system 1 and the external network in accordance with a forwarding table 40 and the IP addresses of the respective devices and the port numbers in the network system 1. In the present disclosure, the forwarding table is an example of association information for associating port numbers in a plurality of networks with each other. Information that the router 4 uses for data transfer between networks may be in any form and is not limited to those having a table structure as illustrated in FIG. 3.

The router 4 transfers data from the external network (external network NT in FIG. 2) to a transfer destination in the network system 1. The router 4 identifies a device as the transfer destination in accordance with the forwarding table. The transfer destination is selected from among one or more of the PC server 2, the MFP 3, and the storage device 5. Furthermore, the router 4 transfers data from a device in the network system 1 to a transfer destination in the external network identified by the forwarding table.

State A in FIG. 1 illustrates a case where the forwarding table 40 does not include an entry of a source in the external network having transmitted the data to the router 4. In this case, the router 4 transfers the data received from the source to all the devices (the PC server 2, the MFP 3, and the storage device 5) in the network system 1 (arrows A01 to A03).

State B in FIG. 1 illustrates that the MFP 3 responds in accordance with the transfer of state A. The response is indicated by an arrow A11.

State C in FIG. 1 illustrates that the router 4 changes the forwarding table 40 in accordance with the response of state B. In state C, the router 4 changes the forwarding table 40 such that information associating the source of the data of state A with the source of the response of state B is added.

[2. Forwarding Table]

FIG. 3 is a diagram illustrating an example of contents of the forwarding table 40. As illustrated in FIG. 3, the forwarding table 40 associates a protocol, an external port number, a LAN side IP address, and a LAN side port number. The protocol is a protocol of transmitted and received data. The external port number is a port number associated with data transmitted from the external network side. The LAN side IP address is an IP address in the network system 1. The LAN side port number is a port number of each of the devices in the network system 1. IP addresses and port numbers illustrated in FIG. 3 conform to the example of the IP addresses and the port numbers of FIG. 2.

For example, a forwarding table 40 of FIG. 3 associates an external port number "9100" with a LAN side port number "9100" of a LAN side IP address "192.168.1.40". Therefore, when data of the port number "9100" is received from the external network, the router 4 transfers the data to the port number "9100" of the MFP 3 corresponding to the LAN side IP address "192.168.1.40" of the LAN side port number "9100".

The forwarding table 40 of FIG. 3 has an entry including an external port number "1". However, in this entry, the external port number "1" is not associated with any LAN side IP address or any LAN side port number. Due to this, upon receiving data of the port number "1" from the external network, the router 4 does not transfer the data to any of the devices in the network system 1 and transmits, to a source of the data, information indicating that transmission of data of that port number is prohibited. In this manner, registration of an external port number not associated with a LAN side IP address or a LAN side port number in the forwarding table 40 means that the forwarding table 40 prohibits transfer data of that external port number in the network system 1.

The forwarding table 40 in FIG. 3 associates an external port number "21" to a LAN side port number "21" of the LAN side IP address "192.168.1.40" and the LAN side port number "21" of the LAN side IP address "192.168.1.50". Therefore, when the router 4 receives data of the port number "21" corresponding to the LAN side IP address "192.168.1.50" from the PC server 2, the router 4 transfers the data to a device corresponding to the external port number "21".

[3. Changing Forwarding Table]

Modes of changing the forwarding table are listed below.

(Addition of Port Number)

The forwarding table 40 of FIG. 3 does not include an entry corresponding to an external port number "80". Therefore, upon receiving data of the external port number "80", the router 4 transfers the data to all the devices (the PC server 2, the MFP 3, and the storage device 5) in the network system 1. Upon receiving a response to the data, the router 4 changes the forwarding table 40 by adding information associating a destination of the response to the port number "80". FIG. 4 is a diagram illustrating another example of the forwarding table 40 after the change.

The forwarding table 40 of FIG. 4 contains an entry for the protocol "TCP/UDP (HTTP)" as compared to the forwarding table 40 of FIG. 3. In this entry, the external port number "80" is associated with the LAN side port number "80" of the LAN side IP address "192.168.1.40".

(Deletion of Port Number)

For example, when identifying uninstallation of any application in a device in the network system 1, the router 4 changes the forwarding table 40 by deleting an entry of a port number of a protocol used by the application.

For example, in the case where the information illustrated in FIG. 4 is registered as the forwarding table 40, when the router 4 detects that the MFP 3 (LAN side IP address "192.168.1.40" (see FIG. 2)) has uninstalled an application that processes the HTTP protocol, the router 4 changes the state of the forwarding table 40 from that of FIG. 4 to that of FIG. 3. The forwarding table 40 of FIG. 4 contains an entry for the protocol "TCP/UDP (HTTP)" while the forwarding table 40 of FIG. 3 does not contain such an entry. That is, upon detecting that the MFP 3 has uninstalled the application that processes the HTTP protocol, the router 4 deletes an entry related to the HTTP protocol from the forwarding table 40.

(Registration of Prohibition Information)

In the present specification, information indicating that transmission of data of a port number is prohibited is also referred to as "prohibition information". For example, when the router 4 receives error responses from within the network system 1 for a given port number, the router 4 updates the forwarding table by registering prohibition information for the port number. FIG. 5 is a diagram illustrating still another example of the forwarding table 40 after the change.

For example, it is assumed that the router 4 has received data of the port number "9100" (protocol "TCP/UDP (LPR)") from the external network and, in response to this, has transferred the data to the LAN side port number "9100" of the MFP 3 (LAN side IP address "192.168.1.40"). Upon receiving an error response from the MFP 3 as a response to this, the router 4 updates the forwarding table by registering prohibition information in the external port number "9100". As a result, the state of the forwarding table 40 is changed from that of FIG. 3 to that of FIG. 5.

In FIG. 3, the external port number "9100" is associated with the LAN side port number "9100" of the LAN side IP address "192.168.1.40" (MFP 3). On the other hand, in FIG. 5, the external port number "9100" is registered in the forwarding table in a state not associated with a LAN side IP address or a LAN side port number. That is, the router 4 registers the external port number "9100" without associating with a LAN side IP address or a LAN side port number and thereby registers the prohibition information for the external port number "9100" in the forwarding table.

[4. Configuration of Network System]

Figure 6:
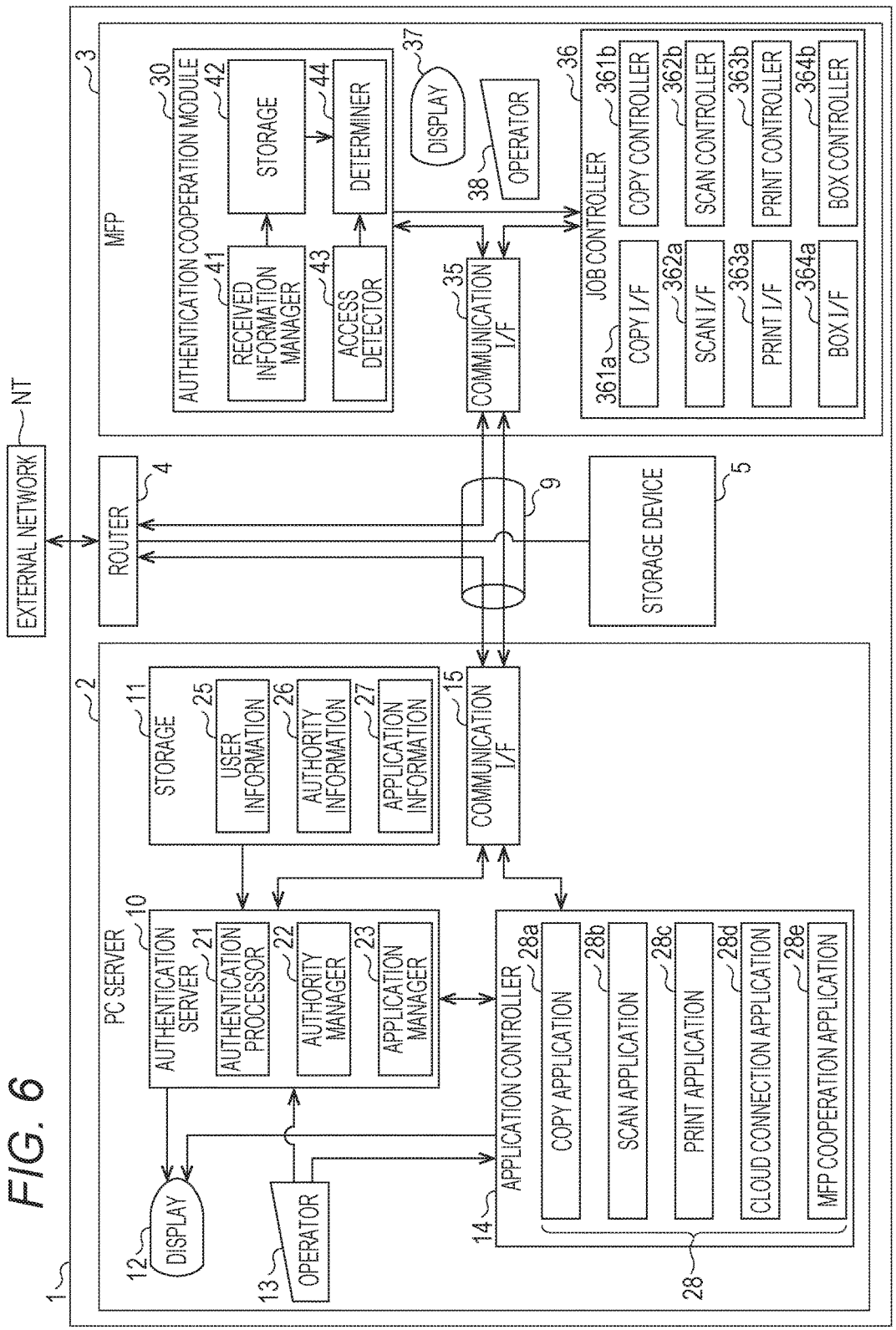
FIG. 6 is a diagram illustrating a configuration example of the network system.

The network system 1 is configured, for example, as an integrated network system. FIG. 6 is a diagram illustrating a configuration example of a network system. As illustrated in FIG. 6, the network system 1 includes the PC server 2, the MFP 3, the router 4, and the storage device 5. A configuration of each of the above will be described below.

(PC Server 2)

The PC server 2 implements a function as a network server. The PC server 2 includes an authentication server 10, a storage 11, a display 12, an operator 13, an application controller 14, and a communication interface (I/F) 15.

The communication interface 15 is implemented by, for example, a network card. The PC server 2 is configured to communicate with other devices via the communication interface 15.

The authentication server 10 is for authenticating a user who uses the MFP 3. The authentication server 10 is implemented, for example, by a processor executing a predetermined program in a hardware configuration including a processor (central processing unit (CPU) 201 in FIG. 8 to be described later) and a memory. The authentication server 10 functions as an authentication processor 21 that performs authentication processing of authenticating a user by executing a predetermined program by the processor, an authority manager 22 that manages authority when each user uses the MFP 3, and an application manager 23 that manages applications 28 that operate the MFP 3.

The storage 11 is an auxiliary storage device configured by, for example, a semiconductor memory or a magnetic disk device. The storage 11 stores user information 25 in which information on a user who uses the MFP 3 is registered in advance, authority information 26 in which authority for each user to use the MFP 3 is registered in advance, and application information 27 in which information on the applications 28 installed in the PC server 2 and remotely controlling the MFP 3 is registered in advance.

The display 12 and the operator 13 function as a user interface of a user using the PC server 2. The display 12 is formed by, for example, a color liquid crystal display and displays various display screens to a user using the PC server 2. The operator 13 receives an operation input from a user using the PC server 2, and is formed by, for example, a keyboard, a mouse, a touch panel arranged on a screen of the display 12, and the like.

The application controller 14 activates the applications 28 that causes the MFP 3 to operate in the PC server 2. As illustrated in FIG. 6, in the PC server 2, a plurality of applications 28a to 28e are installed as applications 28 for operating the MFP 3. The application controller 14 selects and activates at least one application 28 from among the plurality of applications 28a to 28e.

For example, a copy application 28a uses a copy function of the MFP 3, and is capable of causing the MFP 3 to execute a copy job. A scan application 28b uses a scan function of the MFP 3, and is capable of causing the MFP 3 to execute a scan job. A print application 28c uses the print function of the MFP 3 and is capable of causing the MFP 3 to execute a print job. A cloud connection application 28d is connected to a cloud server on the cloud and allows the cloud server and the MFP 3 to mutually cooperate. For example, the cloud connection application 28d allows the cloud server to transfer job data to the MFP 3, or allows the MFP 3 to transfer job data to the cloud server. An MFP cooperation application 28e is an application for allowing a plurality of MFPs to cooperate with each other, for example, allowing one MFP to transfer job data to another MFP. When these applications 28a to 28e are activated by the application controller 14, the PC server 2 can remotely control the MFP 3 to execute a job. When it is not necessary to distinguish among the plurality of applications 28a to 28e, they are collectively referred to as applications 28.

When a user who intends to use the MFP 3 inputs a user ID and a password to the operator 13, the authentication processor 21 of the authentication server 10 performs authentication processing of authenticating the user. That is, the authentication processor 21 reads the user information 25 from the storage 11, determines whether the combination of the user ID and the password input by the user is registered in the user information 25. If the same combination is registered in the user information 25, the authentication is successful, and the authenticated user is identified. On the other hand, if the same combination as the combination of the user ID and the password input by the user is not registered in the user information 25, the authentication processor 21 determines that the authentication has failed.

When the user is authenticated in the authentication processing, the authentication processor 21 notifies the authority manager 22 of information on the authenticated user. The authority manager 22 extracts authority information on the authenticated user from among authority information of a plurality of users registered in the authority information 26 and outputs the extracted information to the authentication processor 21. As a result, the authentication processor 21 can acquire the authority information for the authenticated user to use the MFP 3 as the user is authenticated in the authentication processing.

Upon acquiring the authority information on the authenticated user, the authentication processor 21 notifies the application manager 23 of a function available to the authenticated user or a function unavailable to the authenticated user on the basis of the authority information, and requests application information on any of the applications 28 available to the authenticated user. When the function available to the authenticated user or the function unavailable to the authenticated user is notified from the authentication processor 21, the application manager 23 extracts, from information registered in the application information 27, application information on the applications 28 available to the authenticated user, and outputs the information to the authentication processor 21. As a result, the authentication processor 21 can acquire the application information on the applications 28 available to the authenticated user as the user is authenticated in the authentication processing.

When a user is authenticated in the authentication processing, the authentication processor 21 generates unique identification information related to the PC server 2. This identification information may be, for example, an IP address of the PC server 2 or a server certificate certifying issuance by the authentication server 10.

When authenticating the user in the authentication process, the authentication processor 21 further shifts an operation state of the PC server 2 from a logout state to a login state. The login state is an operation state in which the authenticated user identified in the authentication process can use the MFP 3. The authentication processor 21 establishes a session for communicating with the MFP 3 by a predetermined protocol upon shifting the PC server 2 to the login state and transmits login information to the MFP 3 via the session. The login information includes various information as described below in addition to the application information on the applications 28 available to the authenticated user.

Having transmitted the login information to the MFP 3, the authentication processor 21 causes the application controller 14 to function. As a result, the application controller 14 operates in the PC server 2 to allow the applications 28 to be activated. The authentication processor 21 notifies the application controller 14 of the application information on the applications 28 available to the authenticated user as the application controller 14 is caused to function.

When the application controller 14 functions as the PC server 2 shifts to the login state, the application controller 14 specifies applications 28 available to the authenticated user from among the plurality of applications 28a to 28e on the basis of the application information notified from the authentication processor 21. Then, the application controller 14 generates an application selection screen allowing the identified applications 28 to be selected and displays the screen on the display 12. This allows the authenticated user to select any of the applications 28 available to the user and to give an activation instruction after logging in to the PC server 2. When the applications 28 are selected by the authenticated user, the application controller 14 executes a program corresponding to the selected applications 28 to activate the applications 28.

The applications 28 activated by the application controller 14 transmits an access request to the MFP 3 and starts communication with the MFP 3. The access request transmitted at this time may include various information in addition to the application information set in the applications 28. Then, the applications 28 receive a permission notice from the MFP 3 that permits an access to start processing for remotely controlling the MFP 3. That is, the applications 28 display, on the display 12, a job setting screen for setting a job to be executed in the MFP 3, performs setting of the job for the MFP 3 on the basis of job setting operation by the authenticated user. Furthermore, as operation of instructing execution of the job is performed by the authenticated user, the applications 28 cause the MFP 3 to execute the job specified by the authenticated user.

When communicating with the MFP 3, the applications 28 execute communication using the session established with the MFP 3 by the authentication server 10, for example, by performing communication by mediated by the application manager 23. In this case, the application manager 23 can establish a session between the applications 28 and the MFP 3 by encapsulating information transmitted and received between the applications 28 and the MFP 3 by a predetermined protocol. When the application manager 23 acquires an access request to the MFP 3 from the applications 28 which are not under control thereof, however, the application manager 23 does not encapsulate or transmit such an access request. As a result of this, it is possible to prevent an unauthorized application from transmitting an access request to the MFP 3.

The authentication processor 21 shifts the PC server 2 from the login state to the logout state on the basis of logout operation by the authenticated user. In response to logging out of the authenticated user, the authentication processor 21 transmits logout information to the MFP 3.

(MFP 3)

The MFP 3 implements a function as a multifunction peripheral equipped with functions of a copying machine, a scanner, and a printer. The MFP 3 includes an authentication cooperation module 30, a communication interface 35, and a job controller 36.

The authentication cooperation module 30 of the MFP 3 performs operation in cooperation with the authentication server 10 of the PC server 2. The authentication cooperation module 30 is implemented by a hardware configuration including a CPU, a memory, and an auxiliary storage device, for example, with the CPU executing a predetermined program. The authentication cooperation module 30 functions as a received information manager 41 which manages information transmitted from the authentication server 10 with the CPU executing a predetermined program, an access detector 43 which detects an access from the applications 28 activated in the PC server 2, and a determiner 44 which judges whether to permit an access from the applications 28. The authentication cooperation module 30 has a storage 42. The storage 42 is formed by an auxiliary storage device such as a semiconductor memory or a magnetic disk device.

The job controller 31 includes a copy interface 361a, a scan interface 362a, a print interface 363a, a BOX interface 364a, a copy controller 361b, a scan controller 362b, a print controller 363b, and a storage device 364b. The copy interface 361a, the scan interface 362a, the print interface 363a, and the BOX interface 364a are interfaces for the external applications 28 to remotely control the respective functions of the MFP 3. By permitting an access from the applications 28 by the authentication cooperation module 30, input and output of various data between the applications 28 and the copy controller 361b, the scan controller 362b, the print controller 363b, and the storage device 364b are permitted.

The MFP 3 includes a scanner and a printer (not illustrated in FIG. 6). In the MFP 3, a copy job is executed by, for example, the scanner and the printer. A scan job is executed by, for example, the scanner. A print job is executed by the printer. The copy controller 361b controls the execution of the copy job in the MFP 3. The scan controller 362b controls the execution of the scan job in the MFP 3. The print controller 363b controls the execution of the print job in the MFP 3. The storage device 364b is formed by a magnetic disk device or the like, and stores document data and other data. The copy controller 361b, the scan controller 362b, and the print controller 363b are implemented, for example, by the CPU implemented in the MFP 3 executing a given program. Storage of document data and other data in the storage device 364b is called, for example, "BOX function". By the BOX function, the MFP 3 can also function as a server.

The MFP 3 further includes a display 37 and an operator 38. The display 37 is implemented by, for example, a display device such as a plasma display. The operator 38 is implemented by, for example, hardware buttons and/or software buttons displayed on the display 37. The copy controller 361b, the scan controller 362b, and the print controller 363b may control execution of a copy job, a scan job, and a print job, respectively, in accordance with an input to the operator 38. The BOX function may be implemented in accordance with an input to the operator 38.

The copy controller 361*b*, the scan controller 362*b*, and the print controller 363*b* can display an execution result and other information of the copy job, the scan job, and the print job, respectively, on the display 37. The CPU of the MFP 3 may display an execution result of the BOX function on the display 37.

The communication interface 35 is implemented by, for example, a network card. The MFP 3 communicates with other devices via the communication interface 35.

The received information manager 41 of the authentication cooperation module 30 establishes a session for communicating by a predetermined protocol with the PC server 2 on the basis of a request from the authentication server 10 to allow for a state where information transmitted from the authentication server 10 can be received. Upon receiving login information from the authentication server 10, the received information manager 41 stores and manages the login information in the storage 42. The received information manager 41 manages the login information stored in the storage 42 until logout information is received from the authentication server 10.

After the received information manager 41 receives the login information and the storage 42 stores the login information, the access detector 43 detects an access from the applications 28 activated in the PC server 2. That is, the access detector 43 detects an access request transmitted from the applications 28 via the session established with the authentication server 10 and outputs the access request to the determiner 44. By receiving the access request via the session with the authentication server 10, the access detector 43 can determine that the applications 28 that are the source of the access request has certain reliability. Therefore, when receiving the access request via the session with the authentication server 10, the access detector 43 outputs the access request to the determiner 44. When receiving the access request not via the session, the access detector 43 does not output the access request to the determiner 44. As a result, applying a primary filter to the access request before performing the determination by the determiner 44 allows the security of the network system 1 to be improved.

Upon acquiring the access request from the access detector 43, the determiner 44 reads the login information stored in the storage 42, collates information included in the access request with information included in the login information, and determines whether to permit the access from the application 28. That is, when the information included in the login information received from the authentication server 10 matches the information included in the access request received from the applications 28, the determiner 44 determines that the applications 28 are highly reliable and permits the access from the applications 28. On the other hand, when the information included in the login information does not match the information included in the access request, the determiner 44 refuses the access from the applications 28 since the reliability of the applications 28 cannot be verified. Then, the determiner 44 notifies the applications 28 that are a source of the access request of the determination result of the access request.

Upon transmitting a permission notice permitting the access to the applications 28, the determiner 44 instructs the job controller 31 to release, to the applications 28, an interface corresponding to a function available to the authenticated user from among the copy interface 361*a*, the scan interface 362*a*, the print interface 363*a*, and the BOX interface 364*a* and to permit an access from the applications 28. As a result, when detecting an access from the interface corresponding to a function available to the authenticated user from among the copy interface 361*a*, the scan interface 362*a*, the print interface 363*a*, and the BOX interface 364*a* from the applications 28 that the determiner 44 has transmitted the permission notice, the job controller 31 permits the access to allow the function of the MFP 3 to be used.

(Router 4)

Figure 7:
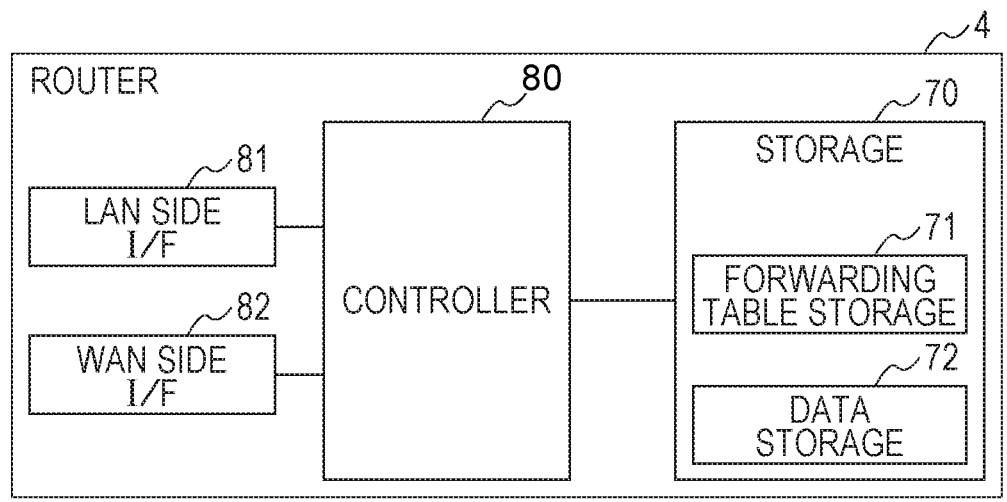
FIG. 7 is a diagram illustrating a configuration example of a router illustrated in FIG. 6.

The router 4 implements a function as a router of the network system 1. FIG. 7 is a diagram illustrating a configuration example of the router 4 illustrated in FIG. 6.

As illustrated in FIG. 7, the router 4 includes a storage 70, a controller 80, a LAN side interface 81, and a WAN side interface 82. The storage 70 is implemented by a nonvolatile memory, for example, and includes a forwarding table storage 71 and a data storage 72. The forwarding table storage 71 stores the forwarding table 40 (e.g. FIG. 1). The data storage 72 stores various programs and data used for processing executed in the router 4.

The controller 80 controls operation of the router 4. The controller 80 includes, for example, a processor that executes a program for implementing a router function.

The LAN side interface 81 is an interface for communicating with other devices in the network system 1, and is implemented by, for example, a network card. The WAN side interface 82 is an interface for communicating with a device on the external network, and is implemented by, for example, a network card.

(Storage Device 5)

Returning back to FIG. 6, the storage device 5 implements a function as a storage device. The storage device 5 is implemented by, for example, a hard disk compatible with Internet Small Computer System Interface (iSCSI).

[5. Hardware Configuration]

Hardware configurations of each of the PC server 2, the MFP 3, and the router 4 will be described.

(PC Server 2)

Figure 8:
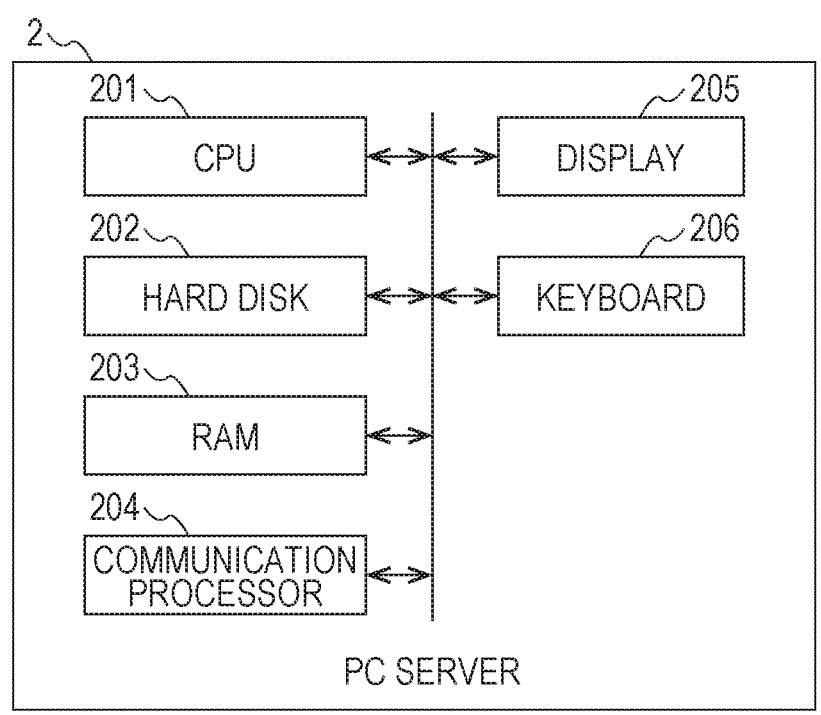
FIG. 8 is a diagram illustrating a hardware configuration of a personal computer (PC) server.

FIG. 8 is a diagram illustrating a hardware configuration of the PC server 2. The PC server 2 includes a CPU 201 which is an arithmetic device functioning as a control device of the PC server 2, a hard disk 202 for storing, in a nonvolatile manner, a program executed by the CPU 201 and other information, a RAM 203 functioning as a work space for the CPU 201 to execute a program, a communication processor 204, a display 205, and a keyboard 206 as an example of an input device.

The hard disk 202 forms the storage 11 in FIG. 6. By executing a given program, the CPU 201 forms the authentication server 10 and the application controller 14 in FIG. 6. The communication processor 204 forms the communication interface 15 in FIG. 6. The display 205 forms the display 12 in FIG. 6. The keyboard 206 forms the operator 13 in FIG. 6.

(MFP 3)

Figure 9:
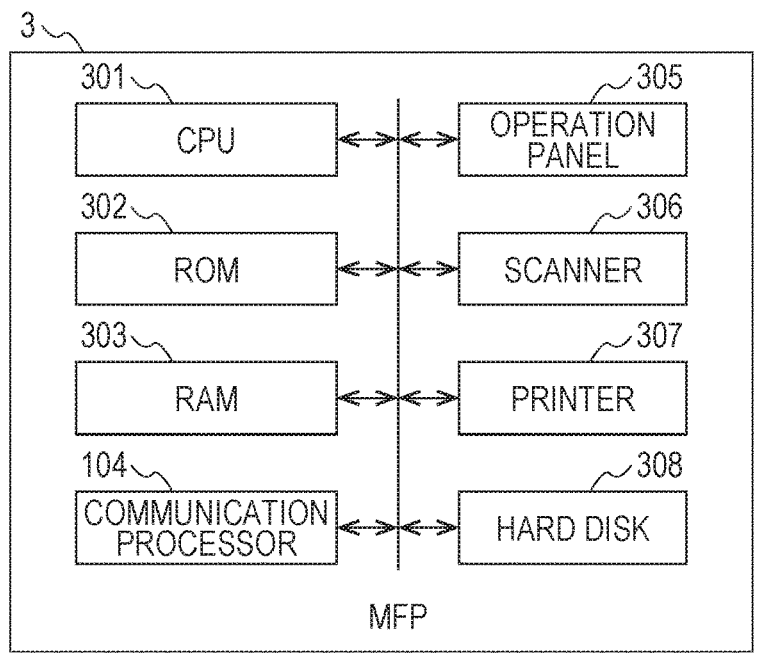
FIG. 9 is a diagram illustrating a hardware configuration of a multifunctional peripheral (MFP)

FIG. 9 is a diagram illustrating a hardware configuration of the MFP 3. Referring to FIG. 9, the MFP 3 includes a CPU 301 which is an arithmetic device functioning as a control device of the MFP 3, a read only memory (ROM) 302 for storing, in a nonvolatile manner, a program executed by the CPU 301 as a memory, a random access memory (RAM) 303 functioning as a work space for the CPU 301 to execute a program, a communication processor 304, an operation panel 305 forming a display device and an input device, a scanner 306 for optically reading a document placed on a document table (not illustrated) and obtaining image data, a printer 307 for fixing the image data on a recording medium (for example, printing paper), and a hard disk 308.

The operation panel 305 includes a touch panel and a group of operation keys (not illustrated). The touch panel may be configured such that a display device such as a liquid crystal display device and a position indication device such as an optical touch panel or a capacitance touch panel overlap with each other. The display device displays an operation screen to specify an indicated position on the operation screen. The CPU 301 causes the touch panel to display the operation screen on the basis of data for displaying the screen stored therein in advance. An operation signal indicating an indicated position (touched position) specified on the touch panel or a pressed key is input to the CPU 301. The CPU 301 specifies an operation content from the pressed key or the displayed operation screen and the indicated position and executes processing on the basis of the operation content.

By executing a given program, the CPU 301 forms the respective elements of the authentication cooperation module 30 of FIG. 6 (the received information manager 41, the access detector 43, and the determiner 44) as well as the respective elements of the job controller 36 of FIG. 6 (the copy interface 361a, the scan interface 362a, the print interface 363a, the BOX interface 364a, the copy controller 361b, the scan controller 362b, the print controller 363b, and the BOX controller 364b). The hard disk 308 forms the storage 42 in FIG. 6. The display device of the operation panel 305 forms the display 37 of FIG. 6. The input device of the operation panel 305 forms the operator 38 of FIG. 6.

(Router 4)

Figure 10:
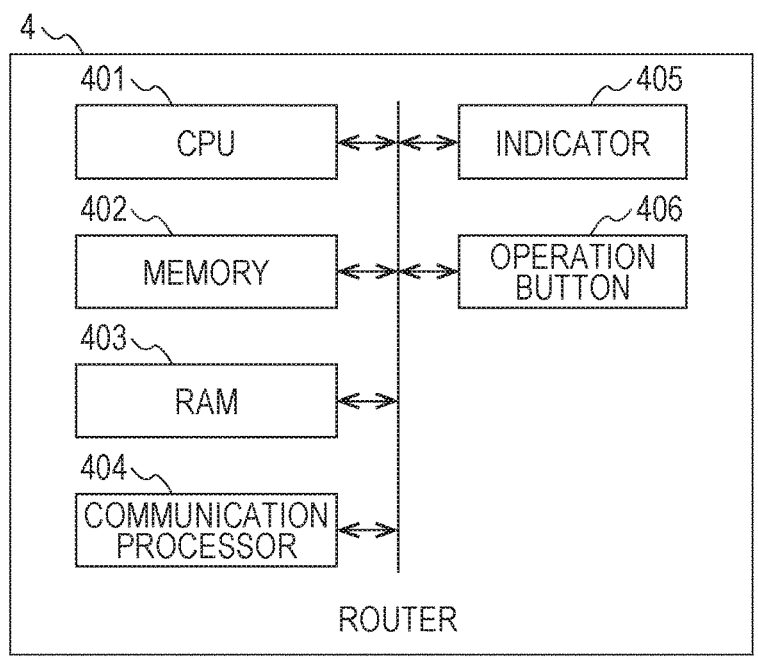
FIG. 10 is a diagram illustrating a hardware configuration of a router.

FIG. 10 is a diagram illustrating a hardware configuration of the router 4. With reference to FIG. 10, the router 4 includes a CPU 401 which is an arithmetic device functioning as a control device of the router 4, a memory 402 for storing, in a nonvolatile manner, a program executed by the CPU 401 or other information, a RAM 403 functioning as a work space for the CPU 401 to execute a program, a communication processor 404, an indicator 405, and an operation button 406 which is an example of an input device. The indicator 405 is formed by, for example, one or more lights. The CPU 401 controls on/off of the lights forming the indicator 405 in accordance with the state of the router 4, for example.

The memory 402 forms the storage 70 in FIG. 7. The CPU 401 forms the controller 80 in FIG. 7 by executing a given program. The communication processor 404 forms the LAN side interface 81 and the WAN side interface 82 in FIG. 7.

[6. Data Transfer]

Figure 11:
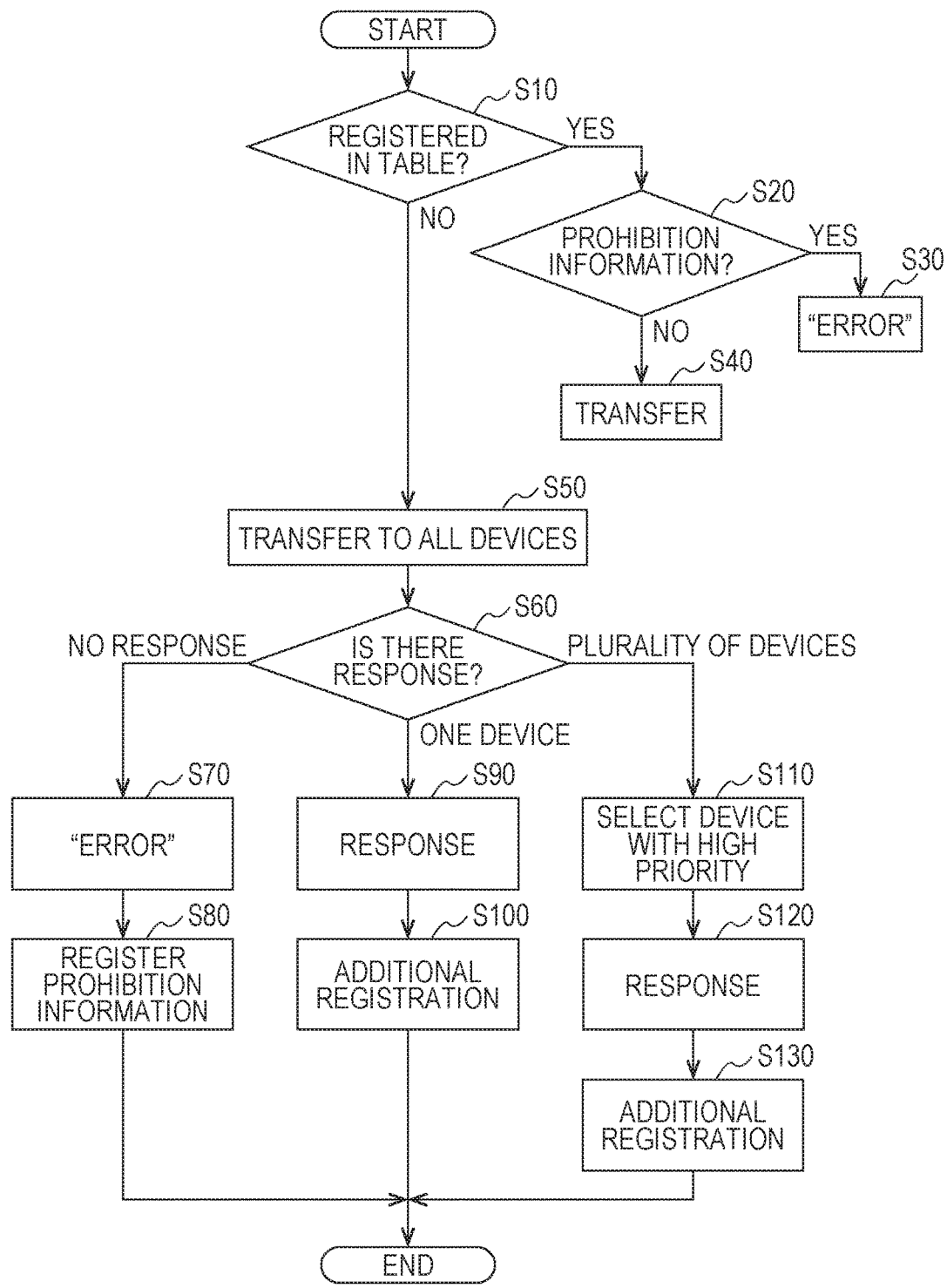
FIG. 11 is an exemplary flowchart of processing for a router to transfer data received from an external network to a device in the network system.

Specific operations of the router 4 when data transmitted from the external network is transferred to a device in the network system 1 will be described. FIG. 11 is an exemplary flowchart of processing for the router 4 to transfer data received from an external network to a device in the network system 1.

Referring to FIG. 1i, in step S10, the CPU 401 of router 4 determines whether a port number to which data received from the external network is associated is registered as an external port number in the forwarding table. If determining that the port number of the received data is registered as an external port number (YES in step S10), the CPU 401 advances the control to step S20, and if determining that it is not registered (NO in step S10), the CPU 401 advances the control to step S50.

In step S20, the CPU 401 determines whether the external port number in step S10 is associated with prohibition information in the forwarding table. The external port number in step S10 is the port number associated with data received by the CPU 401 from the external network. If determining that the external port number in step S10 is associated with prohibition information (YES in step S20), the CPU 401 advances the control to step S30, and if determining that the external port number is not associated with prohibition information (NO in step S20), the CPU 401 advances the control to step S40.

In step S30, the CPU 401 returns a transmission error to the source of the data received from the external network. Thereafter, the processing of FIG. 11 is completed.

In step S40, the CPU 401 transfers the data received from the external network to a transfer destination identified in accordance with the forwarding table. Thereafter, the processing of FIG. 11 is completed.

In step S50, the CPU 401 transfers the data received from the external network to all the devices (the PC server 2, the MFP 3, and the storage device 5) in the network system 1. Thereafter, the control proceeds to step S60.

In step S60, the CPU 401 checks a response to the transfer of the data in step S50 within a predetermined time period from the transfer and advances the control in accordance with a result of the check. That is, if there is no response from any of the devices in the network system 1, the CPU 401 advances the control to step S70. If there is a response from one of the devices in the network system 1, the CPU 401 advances the control to step S90. If there is a response from a plurality of devices in the network system 1, the CPU 401 advances the control to step S110. In the processing of FIG. 11, an example of the data received from the external network is data related to a request. An example of the response in step S60 is transmission of a processing result corresponding to the request. Another example of the data received from the external network is data related to a file transmission request. Another example of the response in step S60 is transmission of the requested file.

In step S70, the CPU 401 returns a transmission error to a source of the data received from the external network. Thereafter, the control proceeds to step S80.

In step S80, the CPU 401 registers, in the forwarding table, prohibition information to the port number of the data received from the external network. As a result, the forwarding table is changed, for example, from the state of FIG. 3 to the state of FIG. 5 (by addition of prohibition information of the external port number "9100"). Thereafter, the processing of FIG. 11 is completed.

In step S90, the CPU 401 transfers the response received from the device in the network system 1 to a source of the data received from the external network. Thereafter, the control proceeds to step S100.

In step S100, the CPU 401 adds information associating the port number of the data received from the external network and a port number of the source of the response in step S90 to the forwarding table. As a result, the forwarding table is changed, for example, from the state of FIG. 3 to the state of FIG. 4 (by addition of an entry of the external port number "80"). Thereafter, the processing of FIG. 11 is completed.

In step S110, the CPU 401 selects a device having the highest priority from among the plurality of devices from which a response has received in step S60. The order of priority is determined by, for example, the number of times of processing the port number received from the external network. In one example, the CPU 401 selects a device having the largest number of times of response to a request for the port number of the received data. Thereafter, the control proceeds to step S120.

In step S120, the CPU 401 transfers the response transmitted from the device selected in step S110 to the source of the data in the external network. Thereafter, the control proceeds to step S130.

In step S130, the CPU 401 adds information associating the port number of the destination of the data of the external network and a port number of the source of the response in step S120 in the network system 1 to the forwarding table. As a result, the forwarding table is changed, for example, from the state of FIG. 3 to the state of FIG. 4 (by addition of an entry of the external port number "80"). Thereafter, the processing of FIG. 11 is completed.

According to the processing of FIG. 11 described above, the CPU 401 can change the forwarding table in accordance with response modes of the devices in the network system 1. Such a change in accordance with response modes is an example of dynamic change of the forwarding table on the basis of the state of the devices in the network system 1.

[7. Installation of Application]

Figure 12:
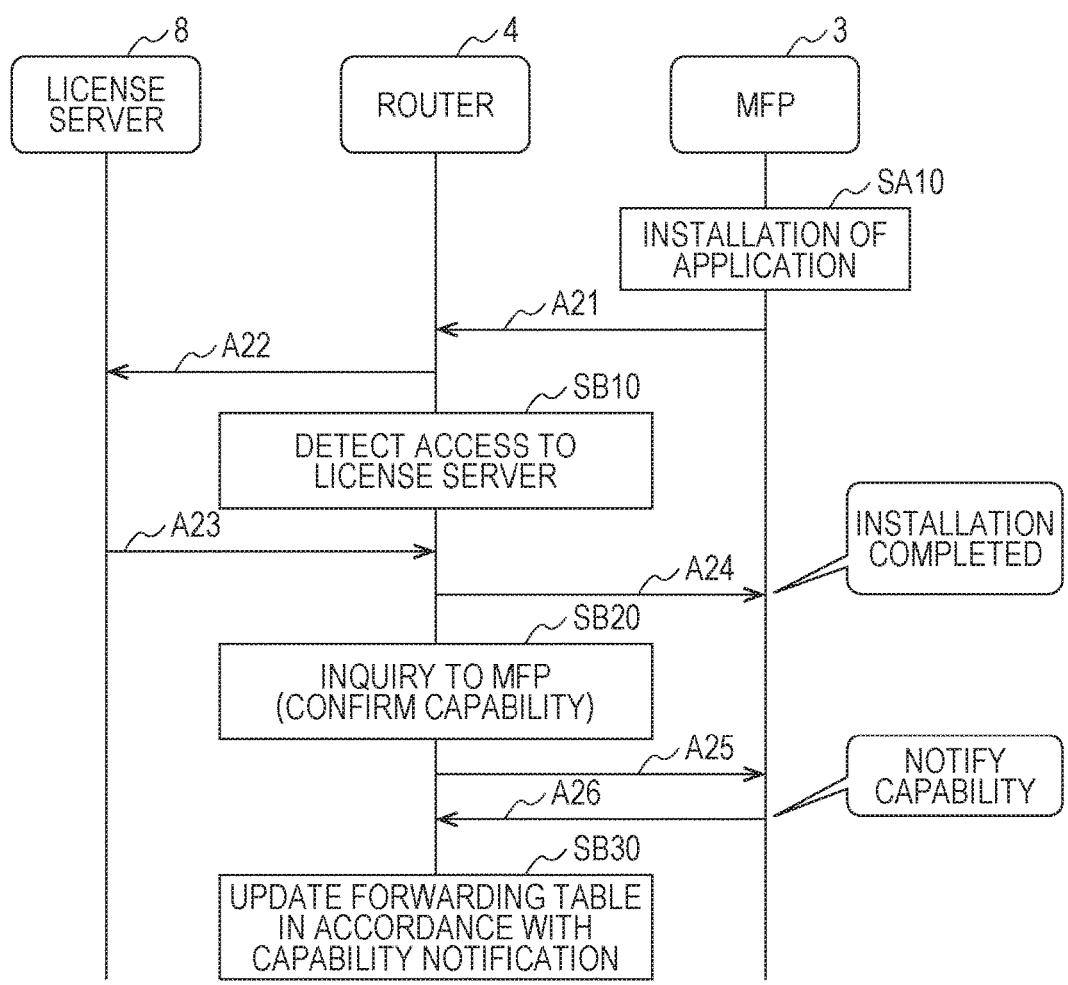
FIG. 12 is a diagram illustrating a sequence of processing of installing an application in the MFP.

FIG. 12 is a diagram illustrating a sequence of processing of installation of an application in the MFP 3. In the sequence of FIG. 12, processing executed by each of the CPU 301 of the MFP 3, the CPU 401 of the router 4, and a license server 8 in the external network is illustrated.

In the sequence illustrated in FIG. 12, when installation of an application program ("application installation") is completed in the MFP 3 (step SA10), the CPU 301 accesses the license server 8 of the application via the router 4. As a result, the CPU of the MFP 3 requests a key for completing the installation of the application (activation). Arrows A21 and A22 in FIG. 12 indicate an access from the MFP 3 to the license server 8. For example, after the program of the application is installed, the application is activated by the key of the application to be in a state enabling execution.

When detecting the access to the server in the external network from the CPU 301 as indicated by the arrow A21, the CPU 401 detects that the MFP 3 is accessing the license server 8 in step SB10. The CPU 401 compares an address of the access destination of the MFP 3 with an address of the license server 8 stored in advance in the hard disk 308 or other components, and in the case of coincidence, the CPU 401 detects that the MFP 3 is accessing the license server 8 in step SB10.

When the key for completion of the installation is transmitted from the license server 8 in response to the access in step SA10, the key is transmitted to the MFP 3 via the router 4. In FIG. 12, the transmission of the key is indicated by arrows A23 and A24.

When the key is transmitted to the MFP 3 as indicated by the arrow A24, the CPU 401 of the router 4 inquires of the MFP 3 whether the installation of the application has been completed (arrow A25) in step SB20. In response to this, the CPU 301 of the MFP 3 responds to the router 4 as to whether the installation of the application has been completed in the MFP 3 (arrow A26).

When notified that the installation of the application has been completed from the MFP 3, the CPU 401 of the router 4 updates the forwarding table in step SB30. In this update, an entry of a port number corresponding to the application is added to the forwarding table. For example, if the application activation of which has been completed in the MFP 3 is an application that handles data of the HTTP protocol, an entry associating a port number of the HTTP protocol with the MFP 3 is added to the forwarding table. More specifically, the state of the forwarding table is changed from that of FIG. 3 to that of FIG. 4. The entry added in FIG. 4 includes the external port number "80", the LAN side IP address "192.168.1.40", and the LAN side port number "80".

According to the sequence of FIG. 12, when requested of an access to a specific address from a device in the network system 1, the router 4 inquires of the device about the state of the device and changes the association information in accordance with a result of the inquiry. In FIG. 12, as an example of the state of the device, completion of the installation of the application corresponding to the license server 8 is illustrated.

Note that, in a similar sequence to the sequence of FIG. 12, the router 4 may inquire of the MFP 3 whether uninstallation of a predetermined application has been completed. The router 4 may update the forwarding table in response to detection of completion of uninstallation of the predetermined application in the MFP 3. In the update, prohibition information is registered for a port number corresponding to the application in the forwarding table.

Figures 13, 14:
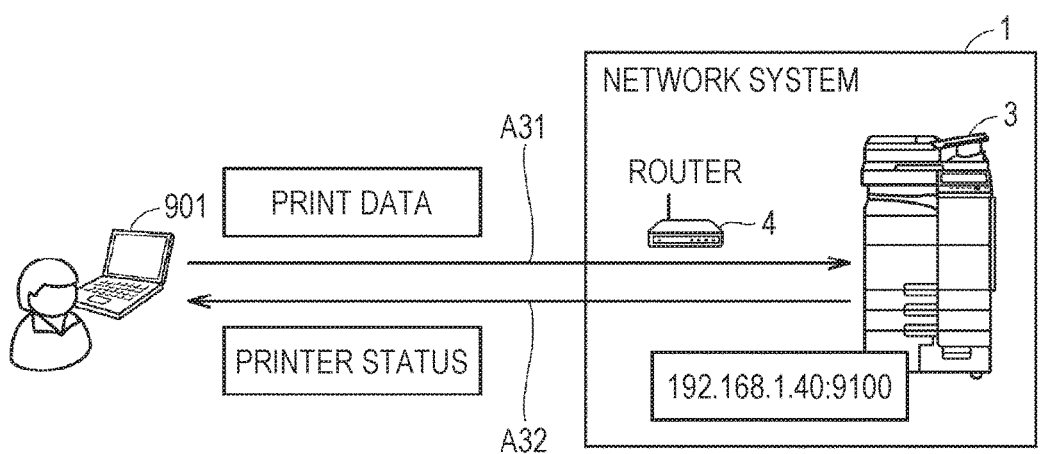
FIG. 13 is a diagram illustrating yet another example of the forwarding table.
FIG. 14 is a diagram for explaining a control mode relating to transfer of print data.

FIG. 13 is a diagram illustrating still another example of the forwarding table. For example, in the MFP 3, when the uninstallation of the application handling data of the HTTP protocol has been completed, the state of the forwarding table is changed from that of FIG. 4 to that of FIG. 13. In FIG. 13, in the forwarding table, the external port number "80" is registered without being associated with any specific LAN side IP address or a LAN side port number.

However, when installation of the application is completed in the MFP 3 after the prohibition information is registered in the external port number "80" as illustrated in FIG. 13, the forwarding table is changed again such that the external port number "80" is associated with the LAN side IP address "192.168.1.40" and the LAN side port number "80" as illustrated in FIG. 4.

According to the sequence of FIG. 12 described above, the CPU 401 of the router 4 can change the forwarding table in accordance with modes of installing/uninstalling an application in the MFP 3. Such a change of the forwarding table is an example of dynamic change of the forwarding table on the basis of the state of the devices in the network system 1.

[8. IP Address when Data is Transferred to External Network]

When returning data from a device in the network system 1 to the external network, the router 4 may associate the response with the IP address of the router 4, or may associate the response with an IP address of a device as a source of the data in the network system 1. The CPU 401 of the router 4 determines whether to associate the response with the IP address of the router 4 or the IP address of the device as the source on the basis of a port number of the response, for example.

FIG. 14 is a diagram for explaining a control mode related to transfer of print data. In the control illustrated in FIG. 14, (the CPU 401 of) the router 4 transfers print data from an external device 901 to the MFP 3 as indicated by an arrow A31. In response to this, the MFP 3 returns a status as a printer. The router 4 (CPU 401) transfers this response to the external device 901 in association with the IP address of the MFP 3 (LAN side IP address "192.168.1.40").

[9. Control over Acquisition Request of MIB Information]

Figure 15:
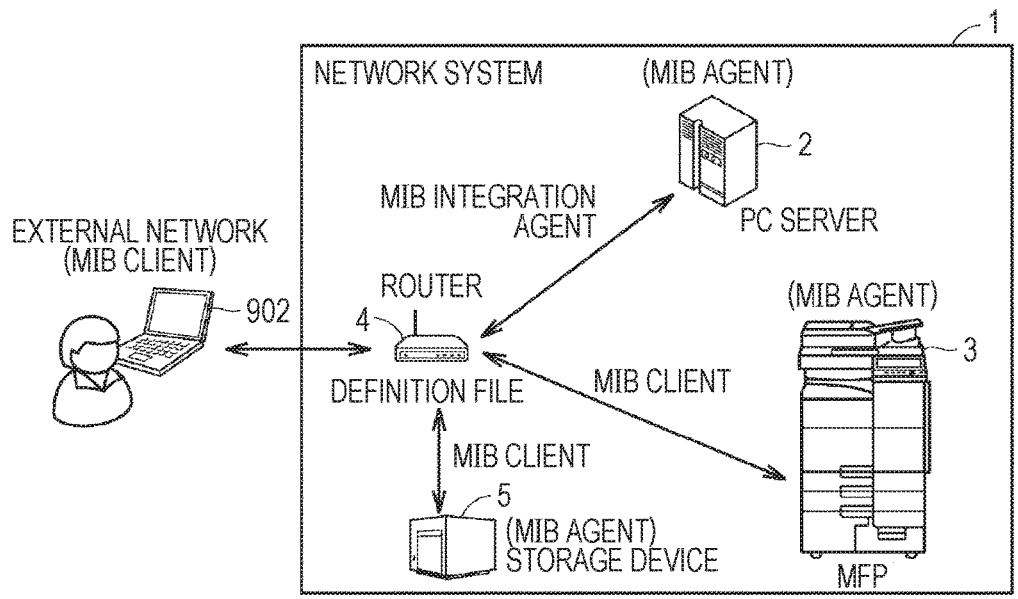
FIG. 15 is a diagram illustrating an example in which the router transmits a response to an acquisition request of management information base (MIB) information from the external device.

FIG. 15 is a diagram illustrating an example in which the router 4 transmits a response to an acquisition request of management information base (MIB) information from an external device 902.

In the example of FIG. 15, in response to an acquisition request of MIB information, the router 4 transfers the acquisition request of MIB information to the respective devices in the network system 1 (the PC server 2, the MFP 3, and the storage device 5). The respective devices return MIB information thereof to the router 4. The router 4 returns the MIB information of the respective devices to the external device 902.

A definition file for avoiding conflict of MIB information of the devices in the network system 1 is stored in the memory 402 (FIG. 10) of the router 4. When the MIB information returned from two or more devices conflict, in order to solve the conflict, the router 4 can convert each piece of the conflicting MIB information according to the definition file and then transfer the MIB information to the external device 902. As a result, for example, MIB information of the MFP 3 may be transferred as MIB information of the original MFP 3, or may be transferred after being converted to MIB information of a new device name.

The above definition file may integrate MIB information associated with a plurality of functions. For example, the above definition file integrates MIB information of a device in the network system 1 having a file storing function and MIB information of a device in the network system 1 having a printing function into a single device. As a result, the external device 902 can manage a part having the file storing function and a part having the printing function in the network system 1 as a single device.

[10. Switching Control of Transfer Destination in Accordance with Address of Request Source]

Figure 16:
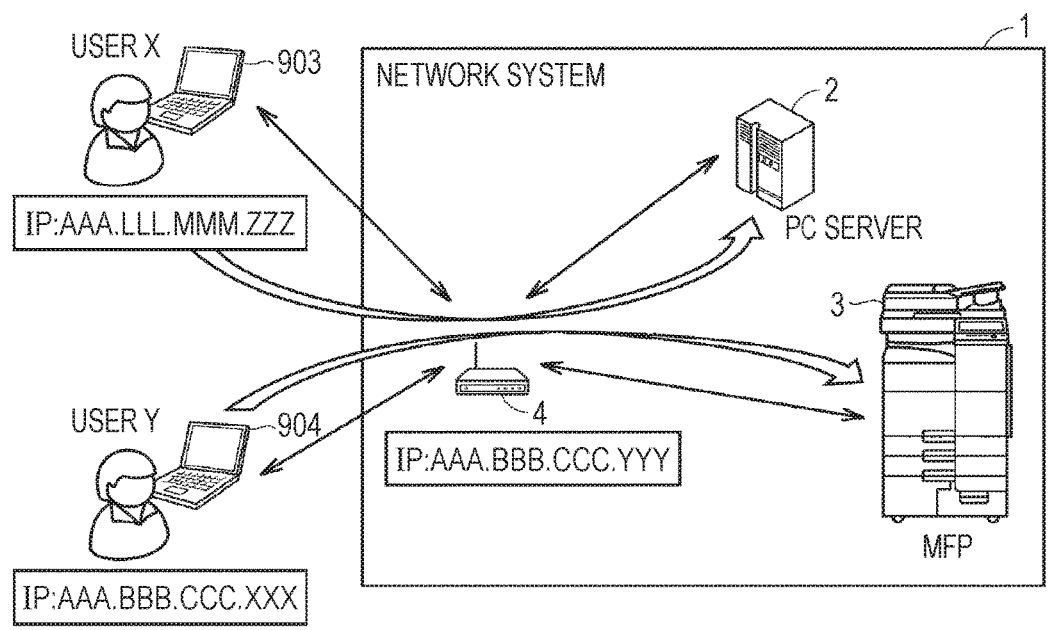
FIG. 16 is a diagram for explaining determination of a transfer destination in accordance with a request source address in the network system.

When receiving a request from the external network, the router 4 may change the forwarding table in accordance with an address of the request source. FIG. 16 is a diagram for explaining determination of a transfer destination in accordance with a request source address in the network system.

In the example illustrated in FIG. 16, IP addresses of an external device 903, an external device 904, and the router 4 are set as follows:

IP address of the external device 903: AAA.LLL.MMM.ZZZ;

IP address of the external device 904: AAA.BBB.CCC.XXX; and

IP address of the router 4: AAA.BBB.CCC.YYY.

In the above example, a case is assumed where the forwarding table associates a port number of a device in the external network with the PC server 2 and the MFP 3.

In this case, when first sixteen bits of the IP addresses of the device and the router 4 are common, the router 4 changes the forwarding table such that data from the device is associated only with the MFP 3. That is, upon receiving a request from the external device 904, the router 4 transfers the request to the MFP 3.

On the other hand, when the first sixteen bits of the IP addresses of the device and the router 4 are not common, the router 4 changes the forwarding table such that the data from the device is associated only with the PC server 2. That is, upon receiving the request from the external device 903, the router 4 transfers the request to the PC server 2.

In the example of FIG. 16, the device 904 with an IP address the first sixteen bits of which are common to those of the router 4 is considered to be located relatively close to the router 4. On the other hand, the device 903 with an IP address the first sixteen bits of which are not common to those of the router 4 is considered to be located relatively far from the router 4. As a result, data transmitted from a location close to the network system 1 is transferred to the MFP 3 to be printed while data transmitted from a location far from the network system is transferred to the PC server 2 to be accumulated in the PC server 2.

[11. Modification]

The network system 1 described above includes the PC server 2, the MFP 3, the router 4, and the storage device 5. That is, in the network system 1, the PC server 2, the MFP 3, the router 4, and the storage device 5 behave as a single device. On the other hand, each of the PC server 2, the MFP 3, the router 4, and the storage device 5 may be configured to be a transaction object solely as a separate device.

Processing executed in each of the PC server 2, the MFP 3, and the router 4 may be executed by one processor (CPU) as described with reference to FIGS. 8 to 10 or may be executed by a plurality of processors.

Although embodiments of the present invention have been described and illustrated in detail, it is clearly understood that the same is by way of illustration and example only and not limitation, the scope of the present invention should be interpreted by terms of the appended claims. The scope of the present invention is intended to include all modifications having equivalent meanings or within a scope equivalent to that of the claims. In addition, the aspects of the invention described in the embodiments and the modifications are intended to be implemented either solely or in combination as far as possible.

What is claimed is:

1. A relay device comprising:
a hardware processor that refers to association information associating an address of a device and a port number in a first network with a port number of a second network to relay communication between the device in the first network and a device in the second network,
wherein the hardware processor dynamically changes the association information based on a state of the device in the first network, and
wherein, in a case where the association information does not identify a transfer destination of a request from a first port number of the second network, the hardware processor:
transfers the request to all devices in the first network;
returns a response to the request received from a device in the first network to the second network as a response to the request; and
changes the association information by associating the device in the first network as a source of the response and a port number in the first network with the first port number.

2. The relay device according to claim 1, wherein, when receiving a response to the request from a plurality of the devices in the first network, the hardware processor returns, to the second network, a response received from one device given a priority from among the plurality of devices according to a predetermined order of priority.

3. The relay device according to claim 2, wherein, when receiving the request, the hardware processor changes the order of priority based on a history of responses of the plurality of devices.

4. The relay device according to claim 2, wherein the hardware processor returns, to the second network, the response received from the one device in association with an address of the one device and a port number.

5. The relay device according to claim 1, wherein, when an access to a specific address is requested from the device, the hardware processor inquires of the device about a state of the device and changes the association information in accordance with a result of the inquiry.

6. The relay device according to claim 5, wherein the inquiry includes an inquiry as to whether an application corresponding to the specific address has been installed.

7. The relay device according to claim 5, wherein the inquiry includes an inquiry as to whether an application corresponding to the specific address has been uninstalled.

8. The relay device according to claim 7, wherein, when receiving, from the device, a response indicating that the application corresponding to the specific address has been uninstalled, the hardware processor changes the association information such that transfer of data to the device is prohibited with respect to a port number corresponding to the application of the first network.

9. The relay device according to claim 1, wherein, in a case where a request from a specific port number in the second network is transferred to a port number of a device in the first network associated with the specific port number in the association information, when there is no response to the request from a device in the first network, the hardware processor deletes, from the association information, information associating the port number of the request with a device and a port number in the first network.

10. The relay device according to claim 1, wherein the association information associates a port number of a plurality of devices in the second network with a port number of the first network.

11. The relay device according to claim 1, wherein, when receiving a request from the first network, the hardware processor changes the association information in accordance with an address of a source of the request.

12. The relay device according to claim 1, wherein the hardware processor is configured integrally with at least one of the devices forming the first network.

13. The relay device according to claim 1, wherein the first network and the second network are different networks.

14. A network system comprising:
a relay part including a hardware processor that refers to association information associating an address of a device and a port number in a first network with a port number of a second network to relay communication between the device in the first network and a device in the second network; and
a functional part including at least one device in the first network,
wherein the hardware processor dynamically changes the association information based on a state of the device in the first network, and
wherein, in a case where the association information does not identify a transfer destination of a request from a first port number of the second network, the hardware processor:
transfers the request to all devices in the first network;
returns a response to the request received from a device in the first network to the second network as a response to the request; and
changes the association information by associating the device in the first network as a source of the response and a port number in the first network with the first port number.

15. A non-transitory recording medium storing a computer readable program executed by a processor controlling a relay device, the program causing the processor to perform processes comprising:
referring to association information associating an address of a device and a port number in a first network with a port number of a second network to relay communication between the device in the first network and a device in the second network; and
dynamically changing the association information based on a state of the device in the first network,
wherein, in a case where the association information does not identify a transfer destination of a request from a first port number of the second network, the program causes the processor to perform processes comprising:
transferring the request to all devices in the first network;
returning a response to the request received from a device in the first network to the second network as a response to the request; and
changing the association information by associating the device in the first network as a source of the response and a port number in the first network with the first port number.

16. The relay device according to claim 13, wherein the first network is a local area network, and the second network is a network external to the first network.

* * * * *